(12) United States Patent
Inoue et al.

(10) Patent No.: US 9,421,978 B2
(45) Date of Patent: Aug. 23, 2016

(54) CONTINUOUSLY VARIABLE TRANSMISSION AND CONTROL METHOD THEREFOR

(71) Applicant: JATCO LTD, Fuji-shi, Shizuoka (JP)

(72) Inventors: Mamiko Inoue, Ebina (JP); Hiroyasu Tanaka, Atsugi (JP); Masato Mori, Isehara (JP)

(73) Assignee: JATCO LTD, Fuji-Shi, Shizuoka (JP)

( * ) Notice: Subject to any disclaimer, the term of this patent is extended or adjusted under 35 U.S.C. 154(b) by 0 days.

(21) Appl. No.: 14/430,367

(22) PCT Filed: Oct. 11, 2013

(86) PCT No.: PCT/JP2013/077808
§ 371 (c)(1),
(2) Date: Mar. 23, 2015

(87) PCT Pub. No.: WO2014/061601
PCT Pub. Date: Apr. 24, 2014

(65) Prior Publication Data
US 2015/0239476 A1    Aug. 27, 2015

(30) Foreign Application Priority Data
Oct. 15, 2012    (JP) .................. 2012-227840

(51) Int. Cl.
*F16H 61/04*    (2006.01)
*B60W 30/19*    (2012.01)
(Continued)

(52) U.S. Cl.
CPC .............. *B60W 30/19* (2013.01); *B60W 10/04* (2013.01); *B60W 10/06* (2013.01); *B60W 10/101* (2013.01);
(Continued)

(58) Field of Classification Search
CPC ... F16H 61/702; F16H 61/662; F16H 61/684; F16H 61/04; F16H 2061/6614; F16H 2061/6605; Y10T 477/6217; B60W 30/19; B60W 30/20; B60W 10/101; B60W 10/06; B60W 10/107
USPC .......................................................... 475/209
See application file for complete search history.

(56) References Cited

U.S. PATENT DOCUMENTS 5,863,275 A * 1/1999 Nozaki ................. B60W 10/06
                                                              477/107
6,132,334 A   10/2000 Tabata et al.
(Continued)

FOREIGN PATENT DOCUMENTS

EP    2275717 A1 * 1/2011
JP    5-322015 A    12/1993
(Continued)

Primary Examiner — Roger Pang
(74) Attorney, Agent, or Firm — Foley & Lardner LLP

(57) ABSTRACT

A continuously variable transmission includes a variator, a sub-transmission mechanism, target value setting means configured to set a speed ratio corresponding to a select gear position as a target value of a through speed ratio which is an overall speed ratio of the variator and the sub-transmission mechanism, shift control means configured to perform a variator shift of downshifting the variator so that the through speed ratio reaches the target value and a coordinated shift of upshifting the variator to maintain the through speed ratio while downshifting the sub-transmission mechanism immediately after the variator is downshifted, and torque increasing means configured to increase a torque input to the continuously variable transmission from the power source more than a torque before the determination of the downshift instruction during the coordinated shift.

8 Claims, 6 Drawing Sheets

(51) Int. Cl.
- *B60W 10/04* (2006.01)
- *B60W 10/06* (2006.01)
- *B60W 10/101* (2012.01)
- *B60W 10/107* (2012.01)
- *F16H 61/662* (2006.01)
- *F16H 61/684* (2006.01)
- *F16H 63/50* (2006.01)
- *B60W 30/20* (2006.01)
- *F16H 61/70* (2006.01)
- *F16H 61/66* (2006.01)

(52) U.S. Cl.
CPC ............ *B60W 10/107* (2013.01); *B60W 30/20* (2013.01); *F16H 61/04* (2013.01); *F16H 61/662* (2013.01); *F16H 61/66259* (2013.01); *F16H 61/684* (2013.01); *F16H 61/702* (2013.01); *F16H 63/50* (2013.01); *F16H 2061/6605* (2013.01); *F16H 2061/6614* (2013.01); *Y10T 477/6217* (2015.01)

(56) References Cited

U.S. PATENT DOCUMENTS

| | | | |
|---|---|---|---|
| 2006/0003867 A1 | 1/2006 | Inagaki et al. | |
| 2010/0248875 A1* | 9/2010 | Jozaki | F16H 61/66259 474/29 |
| 2010/0248894 A1* | 9/2010 | Jozaki | F16H 61/66259 477/44 |
| 2011/0312469 A1* | 12/2011 | Honda | B60W 10/02 488/39 |
| 2012/0059556 A1* | 3/2012 | Tanaka | F16H 61/66259 701/52 |
| 2012/0135841 A1* | 5/2012 | Watanabe | B60W 10/026 477/115 |

FOREIGN PATENT DOCUMENTS

| | | |
|---|---|---|
| JP | 9-229180 A | 9/1997 |
| JP | 10-47100 A | 2/1998 |
| JP | 10-304514 A | 11/1998 |
| JP | 2004-340202 A | 12/2004 |
| JP | 2006-15873 A | 1/2006 |
| JP | 2012-57710 A | 3/2012 |

\* cited by examiner

CONTINUOUSLY VARIABLE TRANSMISSION AND CONTROL METHOD THEREFOR

TECHNICAL FIELD

The prevent invention relates to a continuously variable transmission and a control method therefor, particularly to a continuously variable transmission with a continuously variable transmission mechanism and a sub-transmission mechanism.

BACKGROUND ART

In a continuously variable transmission in which a continuously variable transmission mechanism (variator) and a sub-transmission mechanism are combined (hereinafter, referred to as a "CVT with a sub-transmission mechanism"), a shifting region can be enlarged as compared with a normal continuously variable transmission and fuel economy can be improved.

In the case of shifting the sub-transmission mechanism in this CVT with the sub-transmission mechanism, it is possible to suppress a change of a through speed ratio, which is a speed ratio of the entire transmission, before and after a shift and suppress a shift shock by performing a coordinated shift of changing a speed ratio of the variator in a direction opposite to a shifting direction of the sub-transmission mechanism.

JP2012-57710A discloses a CVT with a sub-transmission mechanism having a manual mode of controlling a through speed ratio to a speed ratio corresponding to a gear position selected by a driver. In the manual mode, shift responsiveness is improved by a variator shift of changing the through speed ratio by changing only a speed ratio of the variator according to a shifting operation of the driver.

Further, depending on a shifting region, a gear position of the sub-transmission mechanism is switched by a coordinated shift immediately after the variator shift in preparation for the next shift instruction. This is for the following reason.

For example, if the gear position of the sub-transmission mechanism is a gear position on a high side and the driver instructs to downshift from an M3 speed to an M2 speed of the manual mode, a through speed ratio corresponding to the M2 speed cannot be realized even if the variator is shifted to a lowest side.

Accordingly, when the driver instructs to downshift from an M4 speed to the M3 speed, the speed ratio of the variator is changed to a high side while the gear position of the sub-transmission mechanism is switched to a gear position on a low side by subsequently performing the coordinated shift after the through speed ratio corresponding to the M3 speed is realized by the variator shift.

Since this enables a through speed ratio corresponding to the M2 speed to be immediately realized only by the variator shift when a downshift instruction from the M3 speed to the M2 speed is given, shift responsiveness can be improved.

SUMMARY OF INVENTION

In the case of downshifting in response to a shifting operation of the driver during coasting in the manual mode and performing the coordinated shift so as not to change the through speed ratio in preparation for the next shift immediately after the variator shift as described above, the speed ratio of the variator is changed to the high side at the same time that the gear position of the sub-transmission mechanism is changed to the low side by the coordinated shift.

Although the through speed ratio is not changed by this coordinated shift, a secondary rotation speed of the variator, i.e. an input rotation speed of the sub-transmission mechanism increases. Thus, an engaging-side frictional engagement element of the sub-transmission mechanism is gradually engaged while absorbing a rotation speed difference before and after the coordinated shift, whereby a torque is transferred before and after the shift to generate a deceleration G.

Particularly, since the sub-transmission mechanism is shifted successively in a torque phase and an inertia phase during coasting in which an engine torque is a negative value, the generation of the deceleration G is delayed from the deceleration G generated by the variator shift and there is a possibility that a G variation occurs and a sense of discomfort is given to the driver despite a non-operation in the manual mode by the driver due to a dragging feeling caused by the prolonged deceleration G.

This invention aims to suppress the occurrence of a dragging feeling in the case of downshifting during coasting in a manual mode.

According to one aspect of the present invention, a continuously variable transmission mounted in a vehicle and configured to shift and transmit output rotation of a power source includes a variator capable of continuously changing a speed ratio, a stepped sub-transmission mechanism provided in series with the variator, target value setting means configured to select one select gear position corresponding to a shift instruction from a driver from a plurality of select gear positions set in advance and set a speed ratio corresponding to the selected select gear position as a target value of a through speed ratio which is an overall speed ratio of the variator and the sub-transmission mechanism when the shift instruction is determined, shift control means configured to perform a variator shift of downshifting the variator so that the through speed ratio reaches the target value and a coordinated shift of upshifting the variator to maintain the through speed ratio while downshifting the sub-transmission mechanism immediately after the variator is downshifted when the shift instruction is a downshift instruction and a shift condition of the sub-transmission mechanism is satisfied, and torque increasing means configured to increase a torque input to the continuously variable transmission from the power source more than a torque before the determination of the downshift instruction during the coordinated shift when the vehicle is coasting.

Further, according to another aspect of the present invention, a control method for a continuously variable transmission including a variator capable of continuously changing a speed ratio, and a stepped sub-transmission mechanism provided in series with the variator, mounted in a vehicle and configured to shift and transmit output rotation of a power source includes selecting one select gear position corresponding to a shift instruction from a driver from a plurality of select gear positions set in advance and setting a speed ratio corresponding to the selected select gear position as a target value of a through speed ratio which is an overall speed ratio of the variator and the sub-transmission mechanism when the shift instruction is determined, performing a variator shift of downshifting the variator so that the through speed ratio reaches the target value and a coordinated shift of upshifting the variator to maintain the through speed ratio while downshifting the sub-transmission mechanism immediately after the variator is downshifted when the shift instruction is a downshift instruction and a shift condition of the sub-transmission mechanism is satisfied, and increasing a torque input to the continuously variable transmission from the power source more than a torque before the determination of the downshift instruction during the coordinated shift when the vehicle is coasting.

According to these aspects, the torque input to the continuously variable transmission from the power source is increased during the coordinated shift after a downshift based on an instruction from the driver while the vehicle is coasting in a manual mode. This enables suppression of a generation of an unintended dragging feeling by suppressing the generation of a deceleration G caused by an engaging side frictional engagement element of the sub-transmission mechanism absorbing a rotation speed difference before and after the coordinated shift during the coordinated shift.

DESCRIPTION OF EMBODIMENT

Hereinafter, an embodiment of the present invention is described with reference to the accompanying drawings. It should be noted that, in the following description, a "speed ratio" of a certain transmission mechanism is a value obtained by dividing an input rotation speed of this transmission mechanism by an output rotation speed thereof. Further, a "lowest speed ratio" means a maximum speed ratio of this transmission mechanism and a "highest speed ratio" means a minimum speed ratio thereof.

Figure 1:
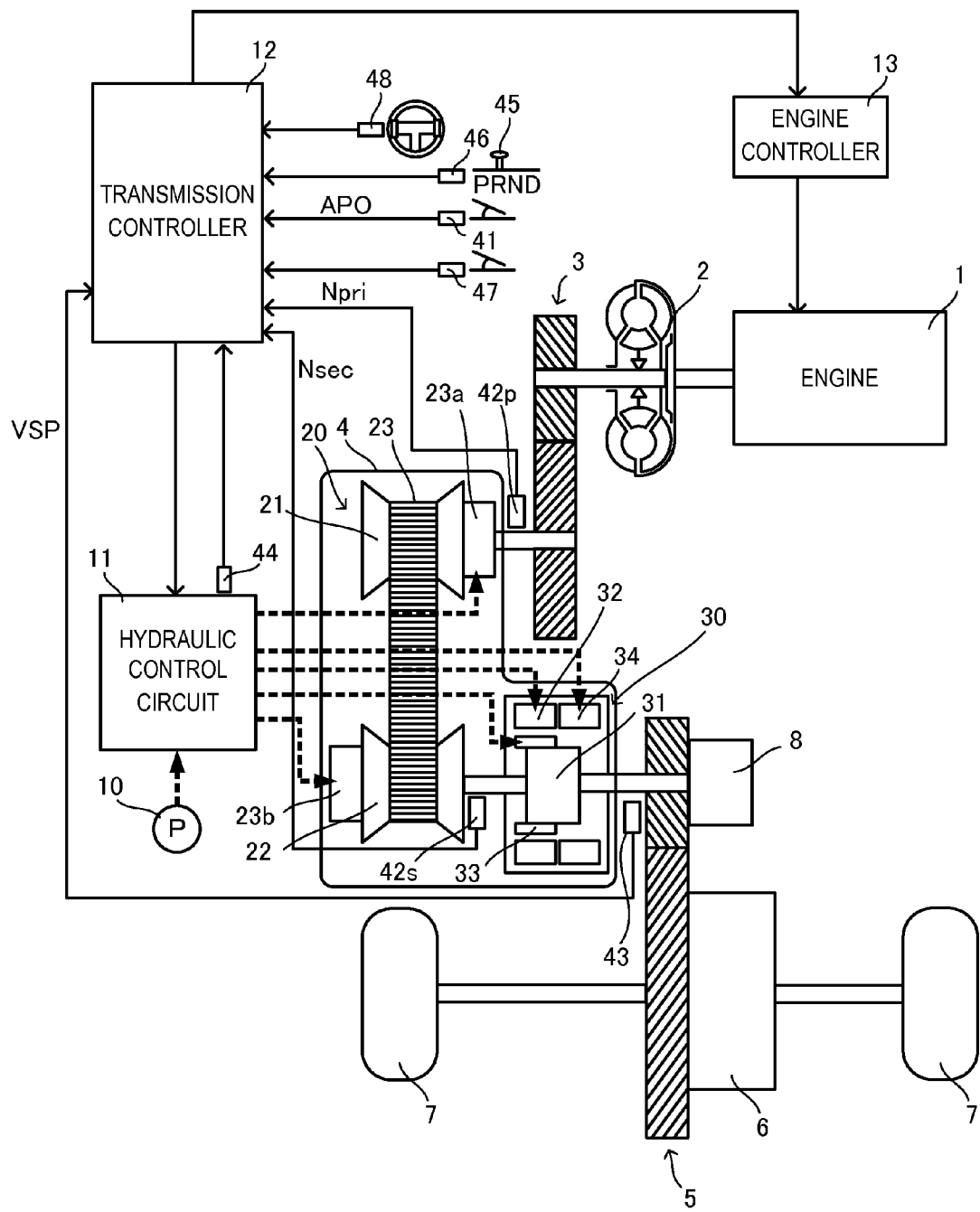
FIG. 1 is a schematic configuration diagram of a vehicle equipped with a continuously variable transmission according to an embodiment of the present invention.

FIG. 1 is a schematic configuration diagram of a vehicle equipped with a continuously variable transmission according to the embodiment of the present invention. This vehicle includes an engine 1 as a power source. Output rotation of the engine 1 is transmitted to drive wheels 7 via a torque converter 2 with a lock-up clutch, a first gear train 3, a continuously variable transmission (hereinafter, merely referred to as a "transmission 4"), a second gear train 5 and a differential device 6. The second gear train 5 includes a parking mechanism 8 for mechanically and unrotatably locking an output shaft of the transmission 4 in a parked state.

Further, the vehicle is provided with an oil pump 10 to be driven using a part of power of the engine 1, a hydraulic control circuit 11 for adjusting a hydraulic pressure from the oil pump 10 and supplying the adjusted hydraulic pressure to each component of the transmission 4, a transmission controller 12 for controlling the hydraulic control circuit 11, and an engine controller 13 for controlling a torque of the engine 1 based on a command from the transmission controller 12.

Each component will be described. The transmission 4 includes a continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in the same power transmission path. The sub-transmission mechanism 30 may be directly connected to an output shaft of the variator 20 as in this example or may be connected via another transmission or power transmission mechanism (e.g. a gear train).

The variator 20 is a V-belt continuously variable transmission mechanism including a primary pulley 21, a secondary pulley 22, and a V-belt 23 mounted between the pulleys 21 and 22. Each of the pulleys 21, 22 includes a fixed conical plate, a movable conical plate arranged with a sheave surface faced toward the fixed conical plate and forming a V-groove between the fixed conical plate and the movable conical plate, and hydraulic cylinders 23a, 23b provided on the back surface of this movable conical plate for displacing the movable conical plate in an axial direction. When hydraulic pressures supplied to the hydraulic cylinders 23a, 23b are adjusted, the widths of the V-grooves change to change a contact radius of the V-belt 23 and each pulley 21, 22, whereby a speed ratio vRatio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. By adjusting hydraulic pressures supplied to the frictional engagement elements 32 to 34 to change engaged/released states of the frictional engagement elements 32 to 34, a gear position of the sub-transmission mechanism 30 is changed. For example, the sub-transmission mechanism 30 is set to a first gear position if the low brake 32 is engaged and the high clutch 33 and the reverse brake 34 are released. The transmission mechanism 30 is set to a second gear position with a speed ratio lower than in the first gear position if the high clutch 33 is engaged and the low brake 32 and the reverse brake 34 are released. Further, the sub-transmission mechanism 30 is set to a reverse gear position if the reverse brake 34 is engaged and the low brake 32 and the high clutch 33 are released. It should be noted that, in the following description, a case where the sub-transmission mechanism 30 is in the first gear position is expressed by that "the transmission 4 is in a low-speed mode" and a case where the sub-transmission mechanism 30 is in the second gear position is expressed by that "the transmission 4 is in a high-speed mode."

Figure 2:
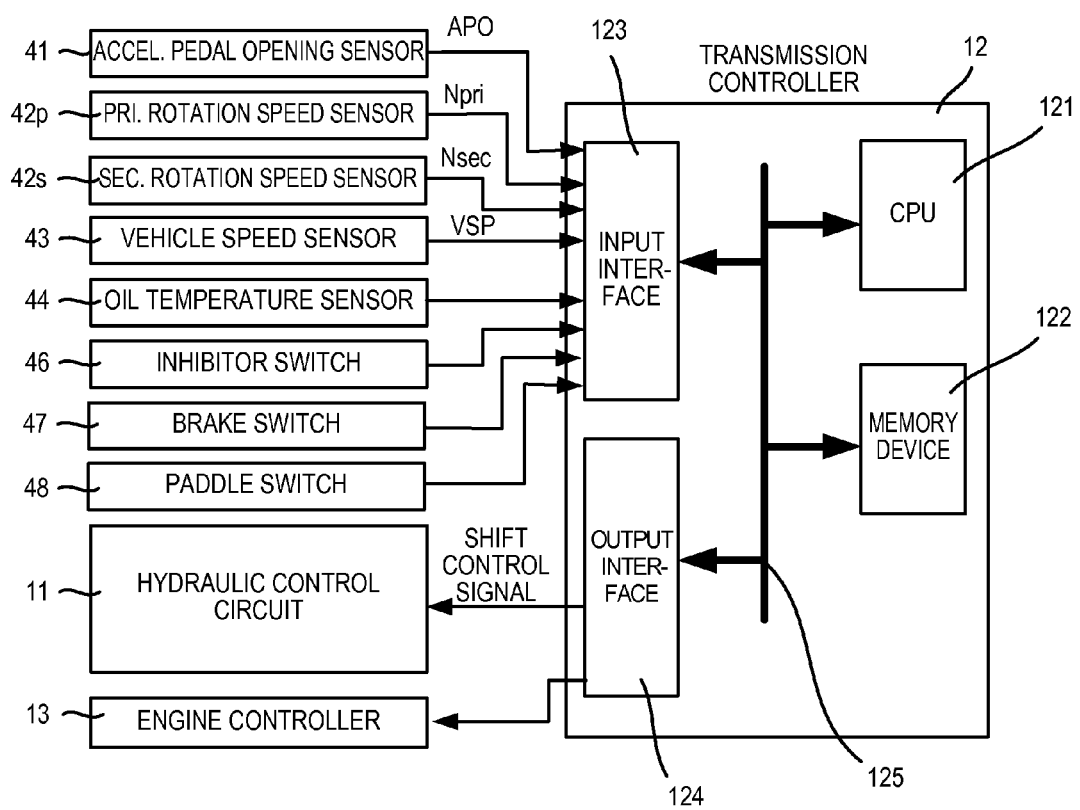
FIG. 2 is a diagram showing the internal configuration of a transmission controller.

The transmission controller 12 is, as shown in FIG. 2, configured by a CPU 121, a memory device 122 composed of a RAM and a ROM, an input interface 123, an output interface 124 and a bus 125 which connects these components to each other.

To the input interface 123 are input an output signal of an accelerator pedal opening sensor 41 for detecting an opening of an accelerator pedal (hereinafter, referred to as an "accelerator pedal opening APO"), an output signal of a primary rotation speed sensor 42p for detecting an input rotation speed of the transmission 4 (=rotation speed of the primary pulley 21, hereinafter referred to as a "primary rotation speed Npri"), an output signal of a secondary rotation speed sensor 42s for detecting an output rotation speed of the transmission 4 (=rotation speed of the secondary pulley 22, hereinafter, referred to as a "secondary rotation speed Nsec"), an output signal of a vehicle speed sensor 43 for detecting a travel speed of the vehicle (hereinafter, referred to as a "vehicle speed VSP"), an output signal of an oil temperature sensor 44 for detecting an oil temperature of the transmission 4, an output signal of an inhibitor switch 46 for detecting the position of a select lever 45, an output signal of a brake switch 47 for detecting the depression of a brake pedal, an output signal of a paddle switch 48 arranged near a steering for selecting a gear position in a manual mode to be described later, and the like.

A shift control program of the transmission 4 and shift maps (FIGS. 3, 4) used in this shift control program are stored in the memory device 122. The CPU 121 reads and executes the shift control program stored in the memory device 122, performs various computations on various signals input via the input interface 123 to generate a shift control signal and an engine control signal, and outputs the generated shift control signal and engine control signal to the hydraulic control circuit 11 and the engine controller 13 via the output interface 124. Various values used in the computations by the CPU 121 and computation results thereof are appropriately stored in the memory device 122.

The hydraulic control circuit 11 is composed of a plurality of flow passages and a plurality of hydraulic control valves. In accordance with a shift control signal from the transmission controller 12, the hydraulic control circuit 11 controls the plurality of hydraulic control valves to switch supply paths of the hydraulic pressure, prepares a necessary hydraulic pressure from a hydraulic pressure produced by the oil pump 10 and supplies this to each component of the transmission 4. In this way, the speed ratio vRatio of the variator 20 and the gear position of the sub-transmission mechanism 30 are changed to shift the transmission 4.

Further, the engine controller 13 controls the torque of the engine 1 based on an engine control signal from the transmission controller 12.

Figure 3:
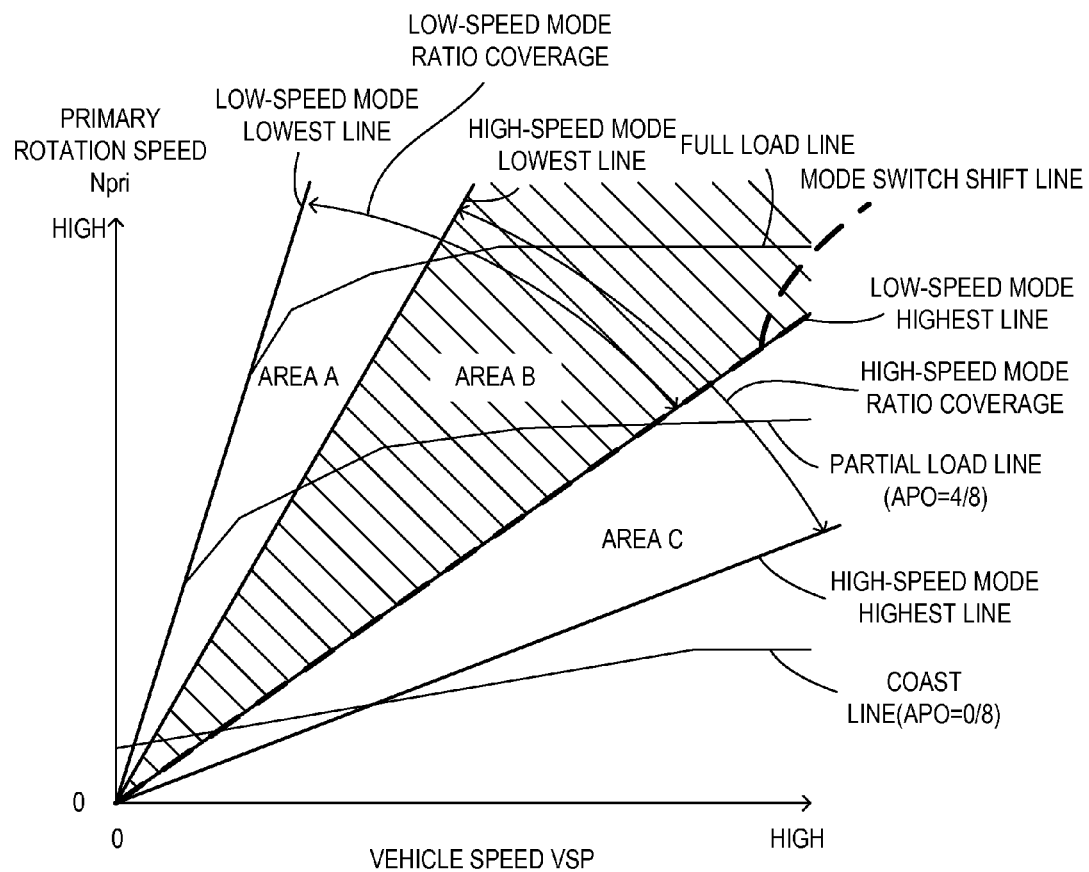
FIG. 3 is a graph showing an example of a shift map used in an automatic mode.

FIG. 3 shows an example of a shift map stored in the memory device 122 of the transmission controller 12. This shift map is a map used in a mode in which the select lever 45 is in a D range and the shift of the transmission 4, i.e. the shift of the variator 20 and the sub-transmission mechanism 30 is automatically performed based on the accelerator pedal opening APO and the vehicle speed VSP (hereinafter, referred to as an "automatic mode").

On this shift map, an operating point of the transmission 4 is determined by the vehicle speed VSP and the primary rotation speed Npri. The inclination of a line connecting the operating point of the transmission 4 and a zero point at the lower left corner of the shift map indicates the speed ratio of the transmission 4 (overall speed ratio obtained by multiplying the speed ratio vRatio of the variator 20 by a speed ratio subRatio of the sub-transmission mechanism 30, hereinafter, referred to as a "through speed ratio Ratio"). In the shift map, a shift line is set for each accelerator pedal opening APO similarly to a shift map of a conventional V-belt continuously variable transmission, and the transmission 4 is shifted in accordance with the shift line selected according to the accelerator pedal opening APO. It should be noted that only a full load line (shift line when the accelerator pedal opening APO=8/8), a partial line (shift line when the accelerator pedal opening APO is 4/8) and a coast line (shift line when the accelerator pedal opening APO=0) are shown in FIG. 3 for simplicity.

When being in the low-speed mode, the transmission 4 can be shifted between a low-speed mode lowest line obtained by maximizing the speed ratio vRatio of the variator 20 and a low-speed mode highest line obtained by minimizing the speed ratio vRatio of the variator 20. At this time, the operating point of the transmission 4 moves in areas A and B. On the other hand, when being in the high-speed mode, the transmission 4 can be shifted between a high-speed mode lowest line obtained by maximizing the speed ratio vRatio of the variator 20 and a high-speed mode highest line obtained by minimizing the speed ratio vRatio of the variator 20. At this time, the operating point of the transmission 4 moves in areas B and C.

The speed ratio in each gear position of the sub-transmission mechanism 30 is so set that a speed ratio corresponding to the low-speed mode highest line (low-speed mode highest speed ratio) is smaller than a speed ratio corresponding to the high-speed mode lowest line (high-speed mode lowest speed ratio). This causes a low-speed mode ratio coverage, which is a range of the possible through speed ratio Ratio of the transmission 4 in the low-speed mode, and a high-speed mode ratio coverage, which is a range of the possible through speed ratio Ratio of the transmission 4 in the high-speed mode, to partially overlap, and the transmission 4 can be selected to be in both the low-speed mode and the high-speed mode when the operating point of the transmission 4 is in the area B between the high-speed mode lowest line and the low-speed mode highest line.

By referring to this shift map, the transmission controller 12 sets the through speed ratio Ratio corresponding to the vehicle speed VSP and the accelerator pedal opening APO as a destination through speed ratio DRatio. This destination through speed ratio DRatio is a target value supposed to be finally reached by the through speed ratio Ratio in this operating state. Then, the transmission controller 12 sets a target through speed ratio tRatio, which is a transient target value for causing the through speed ratio Ratio to follow the destination through speed ratio DRatio with a desired response characteristic, and controls the variator 20 and the sub-transmission mechanism 30 so that the through speed ratio Ratio coincides with the target through speed ratio tRatio.

Further, a mode switch shift line for shifting the sub-transmission mechanism 30 is set to overlap the low-speed mode highest line on the shift map. A through speed ratio corresponding to the mode switch shift line (hereinafter, referred to as a "mode switch speed ratio mRatio") is equal to the low-speed mode highest speed ratio.

When the operating point of the transmission 4 crosses the mode switch shift line, i.e. when the through speed ratio Ratio of the transmission 4 changes over the mode switch speed ratio mRatio, the transmission controller 12 performs a mode switch shift control. In this mode switch shift control, the transmission controller 12 shifts the sub-transmission mechanism 30 and performs a coordinated shift of changing the speed ratio vRatio of the variator 20 in a direction opposite to a changing direction of the speed ratio subRatio of the sub-transmission mechanism 30.

In the coordinated shift, when the through speed ratio Ratio of the transmission 4 becomes smaller than the mode switch speed ratio mRatio from a state where it is larger than the mode switch speed ratio mRatio, the transmission controller 12 upshifts the gear position of the sub-transmission mechanism 30 from the first gear position to the second gear position (1-2 shift) and increases the speed ratio vRatio of the variator 20. Conversely, when the through speed ratio Ratio of the transmission 4 becomes larger than the mode switch speed ratio mRatio from a state where it is smaller than the mode switch speed ratio mRatio, the transmission controller 12 downshifts the gear position of the sub-transmission mechanism 30 from the second gear position to the first gear position (2-1 shift) and reduces the speed ratio vRatio of the variator 20.

The coordinated shift is performed during the mode switch shift to suppress a sense of discomfort of the driver associated with a change of the input rotation caused by a step in the through speed ratio Ratio of the transmission 4. Further, the mode switch shift is performed when the speed ratio vRatio of the variator 20 is a highest speed ratio because, in this state, a torque input to the sub-transmission mechanism 30 is smallest under a torque input to the variator 20 at that time and a shift shock of the sub-transmission mechanism 30 can be alleviated if the sub-transmission mechanism 30 is shifted in this state.

Figure 4:
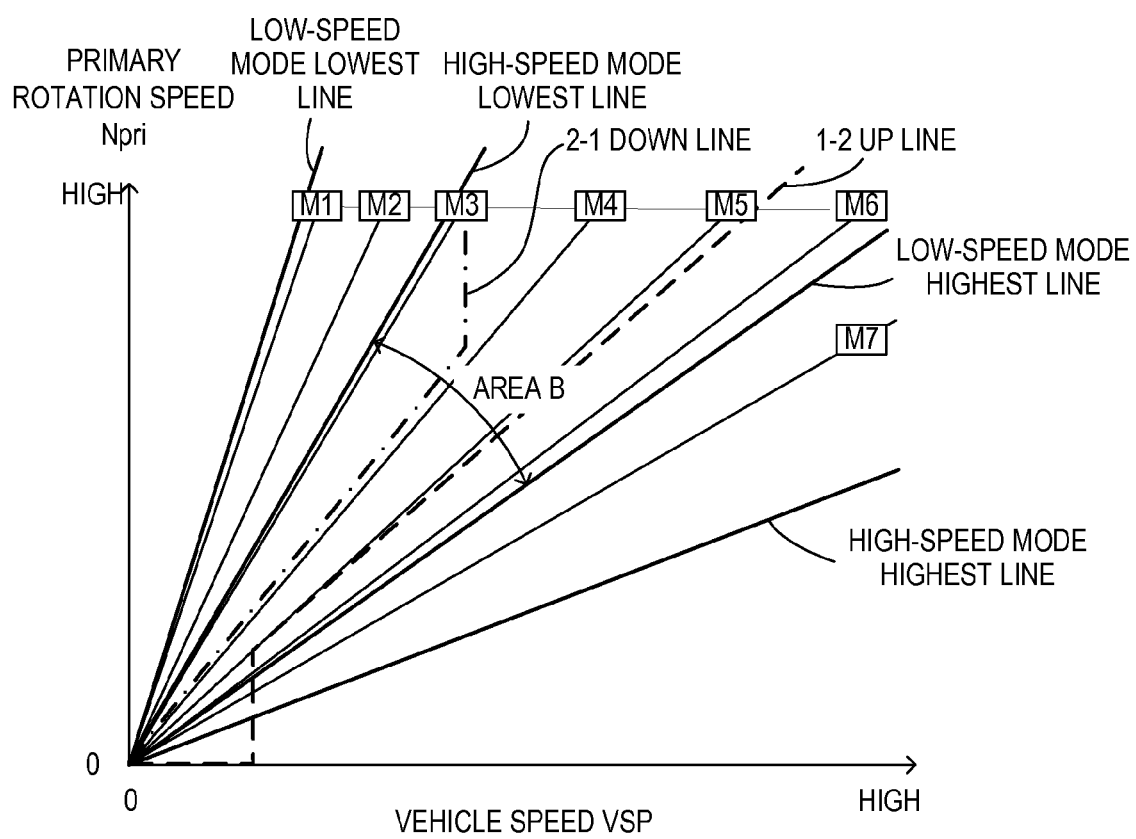
FIG. 4 is a graph showing an example of a shift map used in a manual mode.

FIG. 4 shows an example of a shift map stored in the memory device 122 of the transmission controller 12. This shift map is used in a mode in which, when the driver gives a shift instruction by operating the select lever or a paddle, one gear position corresponding to the shift instruction is selected out of a plurality of gear positions set in advance and at least one of the variator 20 and the sub-transmission mechanism 30 is controlled to fix the speed ratio to the one in the selected gear position (hereinafter, referred to as a "manual mode").

It should be noted that the gear position in the manual mode indicates a fixed shift line set in a pseudo manner on the shift map and the gear positions of the transmission 4 in the manual mode are respectively referred to as M1 to M7 speeds in the following description to be distinguished from the gear positions of the sub-transmission mechanism 30.

In the manual mode shift map shown in FIG. 4, shift lines of a total of seven speeds are set which include an M1 speed line set to extend substantially along a low-speed mode lowest line, an M7 speed line set to be lower than a high-speed mode highest line and higher than a low-speed mode highest line, and M2 to M6 speed lines set between the M1 and M7 speed lines.

The driver instructs a transition to the manual mode by operating the select lever 45, the paddle 48 or the like when wishing to transit to the manual mode. In response to this, the transmission controller 12 changes the shift map from the shift map of the automatic mode shown in FIG. 3 to that of the manual mode shown in FIG. 4. In this way, a transition is made to the manual mode.

When a transition is made to the manual mode, the transmission controller 12 first changes the speed ratio to a speed ratio corresponding to a manual mode shift line closest to the current speed ratio in the manual mode shift map. Alternatively, the current speed ratio may be fixed when a transition is made to the manual mode and may be changed along the shift line when an instruction to shift is given from the driver.

When the driver instructs the desired gear position (M1 to M7) by operating the select lever or the paddle after the transition to the manual mode, the transmission controller 12 moves an operating point to a predetermined shift line of the manual mode shift map shown in FIG. 4 to fix the speed ratio to that of the instructed gear position. In this way, a manual mode shift is realized.

Out of the manual mode shift lines, the M1 and M2 speed lines can be realized only when the sub-transmission mechanism 30 is in the low-speed mode and the M7 speed line can be realized only when the sub-transmission mechanism 30 is in the high-speed mode. Further, the M3, M4, M5 and M6 speed lines can be realized regardless of whether the sub-transmission mechanism 30 is in the low-speed mode or the high-speed mode.

A 2-1 down line for downshifting the sub-transmission mechanism 30 from the high-speed mode to the low-speed mode and a 1-2 up line for upshifting the sub-transmission mechanism 30 from the low-speed mode to the high-speed mode are set in an area (area B) realizable regardless of whether the sub-transmission mechanism 30 is in the low-speed mode or the high-speed mode. Specifically, the 2-1 down line is set between the M3 and the M4 speeds and the 1-2 up line is set between the M5 and M6 speeds.

In the case of downshifting to the M3 speed in response to an instruction of the driver when the sub-transmission mechanism 30 is in the high-speed mode and the M4 speed is selected, the transmission controller 12 determines a high possibility of a transition to the M2 speed, which requires the shift of the sub-transmission mechanism 30, thereafter and downshifts the sub-transmission mechanism 30 immediately after a shift from the M4 speed to the M3 speed only by the variator 20.

Further, in the case of upshifting to the M6 speed in response to an instruction of the driver when the sub-transmission mechanism 30 is in the low-speed mode and the M5 speed is selected, the transmission controller 12 determines a high possibility of a transition to the M7 speed, which requires the shift of the sub-transmission mechanism 30, thereafter and upshifts the sub-transmission mechanism 30 immediately after a shift from the M5 speed to the M6 speed only by the variator 20.

Specifically, in the manual mode, the transmission controller 12 shifts the sub-transmission mechanism 30 immediately after the shift of the variator 20 based on a shift instruction of the driver if one further gear position of the gear position set after shifting the current gear position based on the instruction of the driver is a gear position unrealizable unless the sub-transmission mechanism 30 is shifted.

As just described, a coordinated shift is performed to enhance shift responsiveness when the shift line crosses the 2-1 down line or the 1-2 up line, so that the through speed ratio Ratio of the variator 20 and the sub-transmission mechanism 30 does not change after the through speed ratio Ratio is caused to follow the target through speed ratio tRatio by shifting the variator 20 and the shift to the instructed gear position is completed (hereinafter, this shift is referred to as a "variator shift").

In this way, when the operating point of the transmission is in the area B between the high-speed mode lowest line and the low-speed mode highest line, the sub-transmission mechanism 30 can be shifted in advance by the coordinated shift if the sub-transmission mechanism 30 is predicted to be shifted in the next shift while shift responsiveness of the shift based on the instruction of the driver is ensured by the variator shift. Thus, if a speed ratio corresponding to the gear position based on the subsequent shift instruction of the driver is a speed ratio in the area A or C, shift responsiveness can be ensured by the variator shift since the shift of the sub-transmission mechanism 30 is already completed.

That is, since the through speed ratio Ratio is constantly changed by the variator shift in the case of performing a shift based on a shift instruction of the driver in the manual mode, high shift responsiveness can be constantly realized regardless of a shift pattern (M4 speed→M3 speed, M5 speed→M6 speed, etc.).

Here, in the case of performing a downshift according to a shifting operation of the driver in the manual mode and performing the coordinated shift immediately after the variator shift as described above (in the case of a shift of M4 speed→M3 shift), the speed ratio vRatio of the variator 20 is changed to a high side at the same time as the sub-transmission mechanism 30 is downshifted to the low-speed mode by the coordinated shift.

Although the through speed ratio Ratio is not changed by this coordinated shift, the secondary rotation speed of the variator 20, i.e. the input rotation speed of the sub-transmission mechanism 30 increases. Thus, the low brake 32 that is an engaging-side frictional engagement element of the sub-transmission mechanism 30 is engaged while absorbing a rotation speed difference before and after the coordinated shift, whereby a torque is transferred before and after the shift and a deceleration G is generated.

Particularly, during coasting in which an engine torque is a negative value, the sub-transmission mechanism 30 is shifted successively in a torque phase and an inertia phase. Thus, the generation of the deceleration G in the torque phase of the sub-transmission mechanism 30 in the coordinated shift immediately after the variator shift occurs later than the deceleration G generated by the variator shift before the coordinated shift, wherefore there is a possibility that a sense of discomfort is given to the driver due to a dragging feeling caused by the prolonged deceleration G.

The deceleration G can be possibly reduced by prolonging an engagement time of the low brake 32 (time required for a transition from the released state to the engaged state), but there is, in this case, a possibility that the amount of heat generation of a friction member of the low brake 32 increases to reduce the durability of the friction member.

On the contrary, the amount of heat generation of the friction member can be possibly reduced by shortening the engagement time of the low brake 32, but a variation of the engine rotation speed per unit time becomes larger and drivability is possibly deteriorated due to a shock unintended by the driver.

Figure 5:
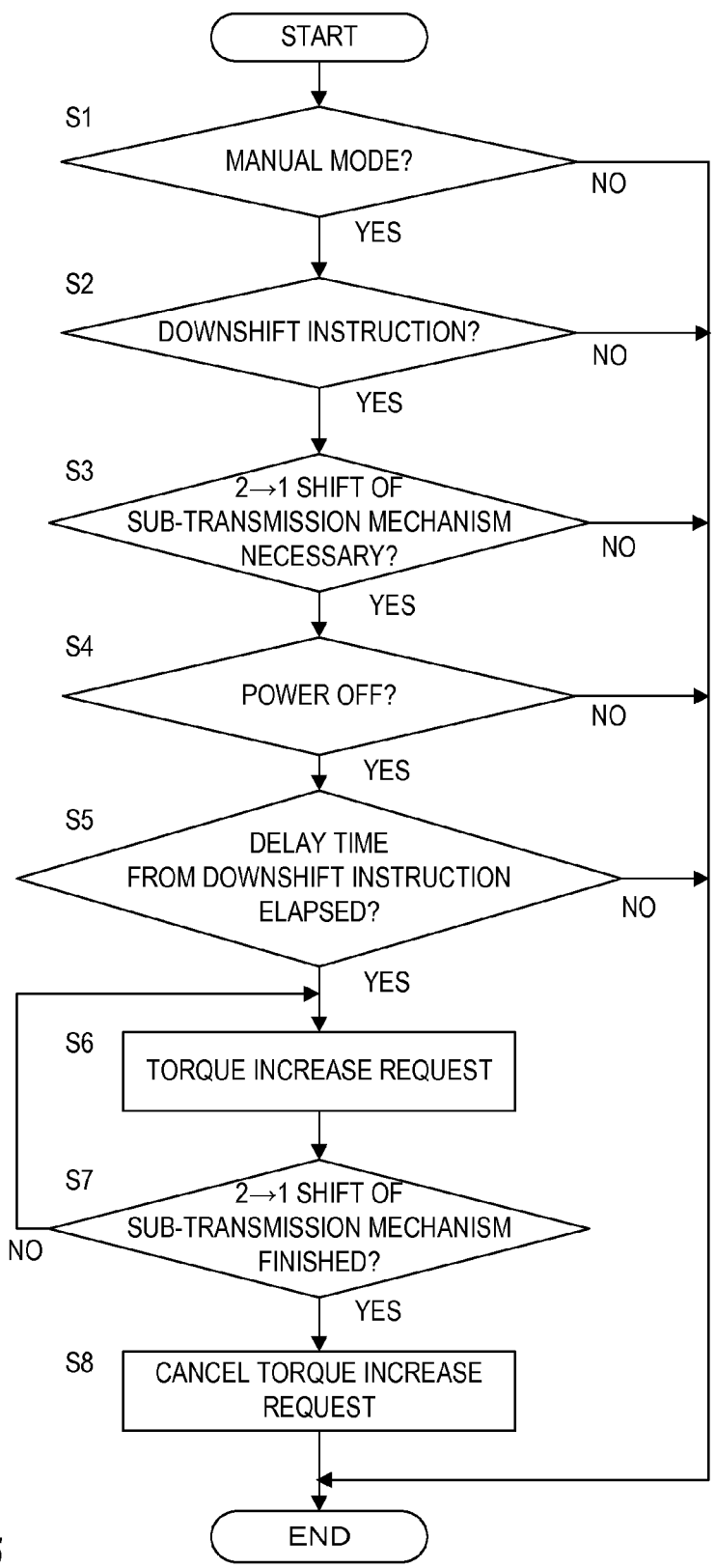
FIG. 5 is a flow chart showing the content of a shift control during a power-off downshift in the manual mode.

Accordingly, the following control is executed in the present embodiment. FIG. 5 is a flow chart showing the content of a control of outputting a command from the transmission controller 12 to the engine controller 13 in the manual mode out of controls executed by the transmission controller 12. Thus, besides this flow chart, there is a flow chart for outputting a command from the transmission controller 12 to the hydraulic control circuit 11 and this flow chart is performed separately from the above flow chart. It should be noted that these flow charts are repeatedly performed at every fixed time (e.g. 10 msec.).

In Step S1, the transmission controller 12 determines whether or not the transmission 4 is in the manual mode. The transmission controller 12 determines that the manual mode is set if the select lever 45 is in an M range or the paddle switch 48 has been operated, for example. The process proceeds to Step S2 if the manual mode is determined to be set and finishes unless the manual mode is determined to be set.

In Step S2, the transmission controller 12 determines whether or not a downshift instruction has been input from the driver. The transmission controller 12 determines that the downshift instruction has been input if the select lever 45 or the paddle switch 48 has been operated to a downshift side, for example. The process proceeds to Step S3 if the downshift instruction is determined to have been input and finishes unless the downshift instruction is determined to have been input.

In Step S3, the transmission controller 12 determines whether or not a 2→1 shift of the sub-transmission mechanism 30 is necessary. The transmission controller 12 determines that the 2→1 shift of the sub-transmission mechanism 30 is necessary if such a shift that the operating point crosses the 2-1 down line on the shift map in the manual mode shown in FIG. 4, i.e. a shift from the M4 speed to the M3 speed, is instructed, for example. The process proceeds to Step S4 if the 2→1 shift of the sub-transmission mechanism 30 is determined to be necessary and finishes if the 2→1 shift of the sub-transmission mechanism 30 is determined to not be necessary.

In Step S4, the transmission controller 12 determines whether or not power is off. The transmission controller 12 determines that power is off during coasting of the vehicle, i.e. in a state where the driver is not depressing the accelerator pedal. It should be noted that power may be off in such a traveling state that, although the accelerator pedal is depressed, the vehicle is actually coasting since the depression amount is relatively small. The process proceeds to Step S5 if power is determined to be off and finishes unless power is determined to be off.

In Step S5, the transmission controller 12 determines whether or not a predetermined delay time has elapsed from the downshift instruction. The transmission controller 12 includes, for example, a timer configured to start counting when the downshift instruction is determined to have been input in Step S2 and determines that the predetermined delay time has elapsed from the downshift instruction when a timer value reaches a predetermined value. The predetermined delay time is a very short time set considering a response delay until the shift of the variator 20 is actually started after the downshift instruction is input. The process proceeds to Step S6 if the predetermined delay time is determined to have elapsed from the downshift instruction while being finished unless the predetermined delay time is determined to have elapsed from the downshift instruction.

In Step S6, the transmission controller 12 outputs a torque increase request to increase the torque of the engine 1 to the engine controller 13. The engine controller 13 increases the torque by increasing an intake air amount and a fuel injection amount of the engine 1. A torque increase amount of the engine 1 is set at such a value capable of suppressing a reduction in the durability of the friction member in engaging the low brake 32.

Since the engine torque before a torque increase is a negative value, the transmission controller 12 increases a torque request value at a predetermined shock preventing increase rate. This can prevent the deceleration G from being generated in the vehicle at the time of engaging the low brake 32 due a drastic increase in the torque request value of the engine 1.

In Step S7, the transmission controller 12 determines the 2→1 shift of the sub-transmission mechanism 30 has been finished. The transmission controller 12 determines that the 2→1 shift of the sub-transmission mechanism 30 has been finished when a state switch between the high clutch 33 (releasing side frictional engagement element) and the low brake 32 (engaging side frictional engagement element) of the sub-transmission mechanism 30 is finished (end phase is completed). The process proceeds to Step S8 if the 2→1 shift of the sub-transmission mechanism 30 is determined to have been finished while returning to Step S6 unless the 2→1 shift of the sub-transmission mechanism 30 is determined to have been finished.

In Step S8, the transmission controller 12 cancels the torque increase request output to the engine controller 13 in Step S6. At this time, the transmission controller 12 reduces the torque request value to the engine torque before the torque increase at a predetermined shock, preventing reduction rate. By reducing the torque request value at the predetermined shock preventing reduction rate, the generation of the deceleration G due to a sudden reduction of the engine torque can be prevented.

The above process will be summarized. The transmission controller 12 increases the engine torque from the start of the variator shift to the end of the coordinated shift when the power-off downshift is performed in the manual mode and the sub-transmission mechanism 30 needs to be downshifted.

Figure 6:
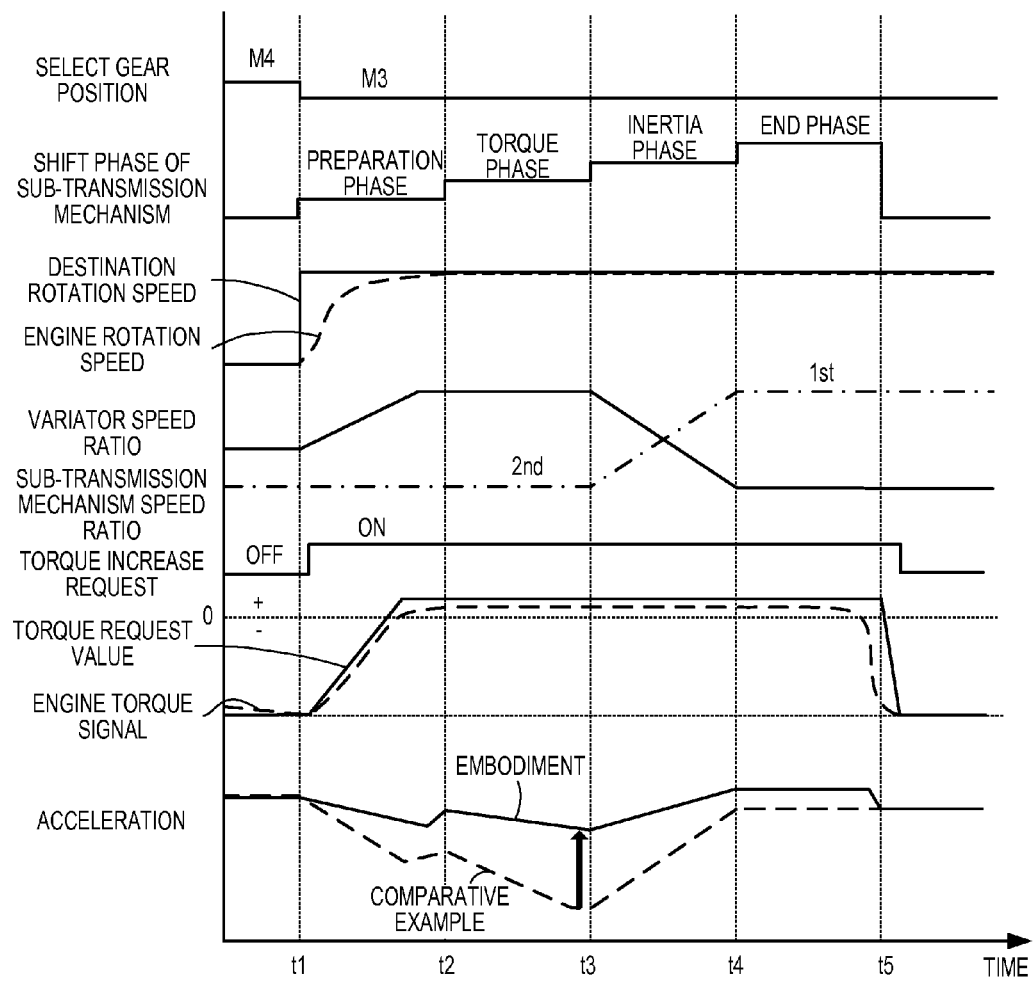
FIG. 6 is a time chart showing states during the power-off downshift in the manual mode.

FIG. 6 is a time chart showing states during the power-off downshift in the manual mode.

When the select lever 45 or the paddle switch 48 is operated during travel in the manual mode to change the selected gear position from the M4 speed to the M3 speed at time t1, the speed ratio vRatio of the variator 20 changes to the low side so that the through speed ratio Ratio follows the target through speed ratio tRatio determined based on the destination through speed ratio DRatio corresponding to the M3 speed. In this way, the through speed ratio Ratio changes and the engine rotation speed increases to a destination rotation speed which is an engine rotation speed corresponding to the M3 speed.

Further, at time t1, a shift phase of the sub-transmission mechanism 30 transitions to a preparation phase in which the preparation of the downshift of the sub-transmission mechanism 30 is started. In the preparation phase, the engagement of the low brake 32 and the release of the high clutch 33 are prepared.

When the predetermined delay time elapses from time t1, the torque increase request is output and the torque request value increases at the predetermined shock preventing increase rate. Associated with this, the engine torque is also gradually increased to follow the torque request value.

Since the torque increase request is output after the elapse of the predetermined delay time, it can be prevented that a sense of discomfort is given to the driver due to a vehicle acceleration feeling caused by a reduction in the deceleration G of the vehicle when there is a response delay until the shift of the variator 20 is actually started after the downshift instruction is input.

Further, since the torque request value is increased at the predetermined shock preventing increase rate, it can be prevented that a sense of discomfort is given to the driver due to the vehicle acceleration feeling generated although the downshift is being performed by the variator shift.

Thereafter, the through speed ratio Ratio reaches the destination through speed ratio DRatio and the variator shift is completed. In this way, the downshift is completed and the select gear position (M3 speed) as instructed by the driver is realized.

At time t2, the shift phase of the sub-transmission mechanism 30 transitions to the torque phase in which the torque is switched between the low brake 32 to be engaged and the high clutch 33 to be released. In this way, the hydraulic pressure supplied to the high clutch 33 decreases and that supplied to the low brake 32 increases.

At this time, since the engine torque is increased in response to the torque increase request, an increase in the deceleration G of the vehicle can be suppressed by suppressing the generation of an inertia caused by increasing the rotation speed on the side of the variator 20 by the low brake 32 when the low brake 32 is engaged.

At time t3, the shift phase of the sub-transmission mechanism 30 transitions to the inertia phase in which the sub-transmission mechanism 30 and the variator 20 are shifted. In this inertia phase, a coordinated shift of reducing the speed ratio vRatio of the variator 20 at the same time as the sub-transmission mechanism 30 is downshifted from the second gear position to the first gear position is performed. In this way, the high clutch 33 is gradually released and the low brake 32 is gradually engaged, whereby the gear position of the sub-transmission mechanism 30 is gradually shifted from the second gear position to the first gear position.

At this time, since the engine torque is increased in response to the torque increase request as in the torque phase, even if the engagement of the low brake 32 proceeds, the generation of an inertia caused thereby is suppressed and an increase in the deceleration G of the vehicle can be suppressed.

At time t4, the shift phase of the sub-transmission mechanism 30 transitions to the end phase.

At time t5, when the coordinated shift is finished, the torque increase request is canceled and the torque request value is reduced to the engine torque before the torque increase at the predetermined shock preventing reduction rate. Associated with this, the engine torque also gradually decreases to follow the torque request value.

Since the torque request value is reduced at the predetermined shock preventing reduction rate, it can be prevented that a sense of discomfort is given to the driver due to a vehicle deceleration feeling generated although the downshift has been completed.

In this way, the process during the power-off downshift in the manual mode is finished.

As described above, in the present embodiment, the engine torque is increased more than the torque before the downshift instruction is determined in the coordinated shift during the power-off downshift in the manual mode. Thus, the generation of an unintended dragging feeling can be suppressed by suppressing the generation of the deceleration G caused by the low brake 32 of the sub-transmission mechanism 30 absorbing the rotation speed difference before and after the coordinated shift during the coordinated shift. Further, a coordinated shift time can be shortened and a reduction in the strength of the friction member can be prevented by suppressing the generation of the deceleration G.

Further, since the torque of the engine 1 is increased until the coordinated shift is finished after the variator shift is started, the generation of the deceleration G can be more reliably suppressed and the generation of an unintended dragging feeling can be suppressed while the coordinated shift is performed.

Further, the 2→1 shift of the sub-transmission mechanism 30 is determined to be necessary when the select gear position selected by the driver is a lowest gear position realizable in the gear position of the sub-transmission mechanism 30 before the shift instruction, i.e. when a downshift instruction from the M4 speed to the M3 speed is given. Since the engine torque is increased in this case, it can be prevented that a sense of discomfort is given to the driver due to the generation of a dragging feeling caused by the continuation of a deceleration feeling during the variator shift to the coordinated shift by performing the coordinated shift immediately after the variator shift.

Further, since the transmission controller 12 increases the toque after the predetermined delay time after the downshift instruction from the driver is input, it can be prevented that a sense of discomfort is given to the driver due to the generation of an acceleration feeling caused by a reduction in the deceleration G of the vehicle, even if there is a response delay until the shift of the variator 20 is actually started after the downshift instruction is input.

Further, since the transmission controller 12 increases the torque request value at the predetermined shock preventing increase rate, it can be prevented that a sense of discomfort is given to the driver due to a vehicle acceleration feeling generated despite the downshift being performed by the variator shift.

Further, since the transmission controller 12 reduces the torque request value at the predetermined shock preventing reduction rate, it can be prevented that a sense of discomfort is given to the driver due to a vehicle deceleration feeling generated although the downshift has been completed.

Although the embodiment of the present invention has been described above, the above embodiment is merely an application example of the present invention and not of the nature to limit the technical scope of the prevent invention to the specific configuration of the above embodiment.

For example, although the V-belt continuously variable transmission mechanism is provided as the variator 20 in the above embodiment, the variator 20 may be a continuously variable transmission mechanism in which a chain belt is mounted between the pulleys 21, 22 instead of the V-belt 23.

Further, although the engine 1 is provided as a power source, the power source may be a combination of the engine 1 and a motor or a single motor.

The present application claims a priority of Japanese Patent Application No. 2012-227840 filed with the Japan Patent Office on Oct. 15, 2012, all the contents of which are hereby incorporated by reference.

The invention claimed is:

1. A continuously variable transmission mounted in a vehicle and configured to shift and transmit output rotation of a power source, comprising:
    a variator capable of continuously changing a speed ratio;
    a stepped sub-transmission mechanism provided in series with the variator;
    a target value setting unit configured to select one select gear position corresponding to a shift instruction from a driver from a plurality of select gear positions set in advance and to set a speed ratio corresponding to the selected select gear position as a target value of a through speed ratio, which is an overall speed ratio of the variator and the sub-transmission mechanism, when the shift instruction is determined;
    a shift control unit configured to perform a variator shift to downshift the variator so that the through speed ratio reaches the target value, and a coordinated shift to upshift the variator to maintain the through speed ratio while downshifting the sub-transmission mechanism immediately after the variator is downshifted when the shift instruction is a downshift instruction and a shift condition of the sub-transmission mechanism is satisfied; and
    a torque increasing unit configured to increase a torque input to the continuously variable transmission from the power source more than a torque before the determination of the downshift instruction during the coordinated shift when the vehicle is coasting.

2. The continuously variable transmission according to claim 1, wherein:
    the torque increasing unit increases the torque until the coordinated shift is finished after the variator shift is started.

3. The continuously variable transmission according to claim 1, wherein:
    the shift condition of the sub-transmission mechanism is satisfied when the select gear position selected by the driver is a lowest gear position realizable in the gear position of the sub-transmission mechanism before the shift instruction.

4. The continuously variable transmission according to claim 1, wherein:
    the torque increasing unit increases the torque after the elapse of a predetermined time after the downshift instruction from the driver is determined.

5. The continuously variable transmission according to claim 1, wherein:
    the torque increasing unit increases the torque at a shock preventing increase rate capable of preventing the occurrence of a shock caused by a torque increase.

6. The continuously variable transmission according to claim 1, wherein:
    the torque increasing unit reduces the increased torque at a shock preventing reduction rate capable of preventing the occurrence of a shock caused by a torque reduction.

7. A control method for a continuously variable transmission including a variator capable of continuously changing a speed ratio and a stepped sub-transmission mechanism provided in series with the variator, mounted in a vehicle and configured to shift and transmit output rotation of a power source, comprising:
    selecting one select gear position corresponding to a shift instruction from a driver from a plurality of select gear positions set in advance and setting a speed ratio corresponding to the selected select gear position as a target value of a through speed ratio which is an overall speed ratio of the variator and the sub-transmission mechanism when the shift instruction is determined;
    performing a variator shift of downshifting the variator so that the through speed ratio reaches the target value and a coordinated shift of upshifting the variator to maintain the through speed ratio while downshifting the sub-transmission mechanism immediately after the variator is downshifted when the shift instruction is a downshift instruction and a shift condition of the sub-transmission mechanism is satisfied; and
    increasing a torque input to the continuously variable transmission from the power source more than a torque before the determination of the downshift instruction during the coordinated shift when the vehicle is coasting.

8. A continuously variable transmission mounted in a vehicle and configured to shift and transmit output rotation of a power source, comprising:
    a variator capable of continuously changing a speed ratio;
    a stepped sub-transmission mechanism provided in series with the variator;
    target value setting means for selecting one select gear position corresponding to a shift instruction from a driver from a plurality of select gear positions set in advance and to set a speed ratio corresponding to the selected select gear position as a target value of a through speed ratio, which is an overall speed ratio of the variator and the sub-transmission mechanism, when the shift instruction is determined;
    shift control means for performing a variator shift to downshift the variator so that the through speed ratio reaches the target value, and a coordinated shift to upshift the variator to maintain the through speed ratio while downshifting the sub-transmission mechanism immediately after the variator is downshifted when the shift instruction is a downshift instruction and a shift condition of the sub-transmission mechanism is satisfied; and
    torque increasing means for increasing a torque input to the continuously variable transmission from the power source more than a torque before the determination of the downshift instruction during the coordinated shift when the vehicle is coasting.

* * * * *